United States Patent
Harkcom et al.

(10) Patent No.: US 6,481,192 B1
(45) Date of Patent: Nov. 19, 2002

(54) STEERING TUBE FOR PIVOTALLY ROTATING A HAY HARVESTER GEARBOX

(75) Inventors: Melanie W. Harkcom, New Holland, PA (US); Thomas L. Stiefvater, Ephrata, PA (US); Steven J. Campbell, New Holland, PA (US); Edward J. Clement, Akron, PA (US)

(73) Assignee: New Holland North America, Inc., New Holland, PA (US)

( * ) Notice: Subject to any disclaimer, the term of this patent is extended or adjusted under 35 U.S.C. 154(b) by 15 days.

(21) Appl. No.: 09/896,347

(22) Filed: Jun. 28, 2001

(51) Int. Cl.$^7$ ................................................ A01D 69/00
(52) U.S. Cl. ........................................ 56/10.8; 56/13.6
(58) Field of Search ................................ 56/10.8, 11.9, 56/13.6, 15.2, 15.1, 15.5, 15.7, 2.8, 228, 16.4 R, 6, 7; 180/53.4; 280/419, 442

(56) References Cited

U.S. PATENT DOCUMENTS

| | | | |
|---|---|---|---|
| 4,187,664 A | 2/1980 | Meek | 56/13.6 |
| 4,719,742 A | 1/1988 | Ermacora | 56/16.4 |
| 4,858,418 A | 8/1989 | Von Allwoerden | |
| 4,899,523 A | 2/1990 | Frumholtz | 56/155 |
| 5,172,539 A | 12/1992 | Jennings | 56/6 |
| 5,272,859 A | 12/1993 | Pruitt | 56/15.2 |
| 5,916,112 A | 6/1999 | Stiefvater et al. | |
| 5,964,076 A | 10/1999 | Loehr | 56/6 |
| 6,035,619 A | 3/2000 | Loehr | 56/13.6 |
| 6,044,633 A | 4/2000 | Stiefvater et al. | |
| 6,122,902 A | 9/2000 | Loehr | 56/15.2 |
| 6,182,427 B1 | 2/2001 | Loehr | 56/6 |

Primary Examiner—Robert E. Pezzuto
(74) Attorney, Agent, or Firm—Larry W. Miller; John William Stader

(57) ABSTRACT

A crop harvesting implement has a wheeled frame, a draft tongue pivotable between extreme left and right operating positions, a mechanism for pivoting the tongue, a drive line for transmitting rotational power from a tractor when coupled thereto, a crop harvesting header suspended from the frame and having operable components for engaging and processing crop material, a gearbox for receiving rotational power from the drive line and transmitting the power to the operable components of the crop harvesting header, an input shaft operatively connected to the drive line, a device for mounting the gearbox on the header so that the header rotates, and a steering mechanism for effecting rotational movement of the gearbox in concert with the pivotal movement of the tongue. The steering mechanism is located on the drive line to pivot the gearbox about its generally vertical pivot axis in response to the pivotal movement of the tongue during field operations so as to keep the input shaft of the gearbox at least generally aligned with the tongue.

10 Claims, 3 Drawing Sheets

STEERING TUBE FOR PIVOTALLY ROTATING A HAY HARVESTER GEARBOX

FIELD OF THE INVENTION

The present invention relates generally to a mechanically driven hay harvesting implement having a centrally pivoted draft tongue. In particular, this invention relates to a steering mechanism on the mechanical drive line for pivotally rotating a rotatable gearbox in response to the pivotal movement of the tongue.

BACKGROUND OF THE INVENTION

Pull-type harvesting implements have been utilized for various harvesting operations for many years. These harvesting implements, supported primarily by ground engaging wheels, are made in a variety of configurations, but normally include components supported on a frame. One of these components is a pivotal draft member, commonly called a drawbar or a draft tongue. For convenience, any draft member discussed in the following description will be referred to as a draft tongue.

In pull-type harvesters, the tongue extends forwardly of the frame for attachment to a prime mover, such as a tractor, which pulls the implement and provides operative power for various harvesting components supported by the main frame. For example, if the implement is a mower-conditioner, cutting and conditioning components mounted on the frame require operative power, which are provided mechanically and/or hydraulically by the tractor. Hydraulic drive systems are costly and have been fraught with operational problems, not the least of which is power limitations, particularly when large implements are involved. Thus, in light of such problems, implement designers have turned to the use of a mechanical drive line between the tractor and the harvester.

U.S. Pat. No. 4,187,664, issued Feb. 12, 1980 in the name of Nigel W. Meek, et al. and U.S. Pat. No. 5,172,539, issued Dec. 22, 1992 in the name of Richard E. Jennings, et al., show examples of pull-type harvesting implements having a pivotal tongue and a mechanical drive system for providing operative power to conventional cutting and conditioning components mounted on a frame. In the implement shown in U.S. Pat. No. 4,187,664, the tongue pivots about a vertical axis located at the left side of the implement and the mechanical drive system employs a telescopic shaft coupled to a gear box located on the left side of the implement but forward of the tongue pivot axis. In U.S. Pat. No. 5,172,539, an implement is shown wherein the vertical axis about which the tongue pivots is centrally located along the frame and the gear box, also centrally located, is located forwardly of the tongue pivot axis. Among other things, a centrally located tongue permits operation of the implement on both sides of the tractor, as well as superior maneuverability for steering around obstacles and cutting square corners.

Other examples of prior art pull-type harvesting implements with centrally located pivot tongues and mechanical drive systems with centrally located gear boxes are shown in U.S. Pat. No. 4,899,523, issued Feb. 13, 1990 to Johnny Frumholtz et al., and U.S. Pat. No. 4,719,742, issued Jan. 19, 1988 to Ermacora, et al. In both of these patents, the drive shaft for mechanically driving the gear box is disposed within the tongue.

Another pull-type harvester configuration of the same general nature as those discussed above is the pivot tongue windrower shown in U.S. Pat. No. 5,272,859, issued on Dec. 28, 1993 in the name of Martin E. Pruitt, et al. This patent discloses a central gearbox mounted on the header such that the gearbox is movable relative to the implement frame. The gearbox is rotatable about a vertical axis so that the input shaft into the gearbox can generally follow the pivotal movement of the tongue, which pivots about a rearwardly located vertical axis. This type of pivotal gearbox eliminates the occurrence of sharp angles in universal joints in the mechanical drive line connected to the gear box under conditions where the tongue swings between its extreme angular positions.

To accomplish the coordinated movement of the rotation of the gearbox with the pivotal movement of the tongue, U.S. Pat. No. 5,272,859 discloses a telescoping steering mechanism that interconnects the tongue and the gearbox such that the gearbox is rotated in response to the pivoting movement of the tongue relative to the implement frame. The telescopic action of the steering mechanism is operable to accommodate the changes in distance of the respective connecting points of the telescoping mechanism between the tongue and the gearbox, i.e., as the tongue pivots from side to side, the distance between the different horizontally spaced pivot axes of the tongue and gearbox changes. The telescopic action of the steering mechanism, along with a horizontal pivot or a ball joint, also allows the steering mechanism to follow the vertical movement of the header relative to the tongue without restricting movement of the header or the tongue.

A telescopic steering mechanism, such as taught by U.S. Pat. No. 5,272,859, suffers from operational problems associated with vibration due to the telescopic parts, which by necessity are loosely fitting, and become more so due to wear of the sliding parts. The implement, as can be seen in the drawings of U.S. Pat. No. 5,272,859, can be provided with a rotatable cutting mechanism and a crop conditioning mechanism, which are typical of hay harvesting components. The operation of rotating harvesting components, such as these, provides a substantial amount of vibration within the implement. Since the steering mechanism is loosely constructed to permit the necessary relative pivotal movements of the header and the tongue, operational vibrations are not uncommon. These vibrations lead to noise and wear in other elements and parts of the harvester. Furthermore, the looseness of the elements and the sliding action therebetween also cause substantial wear in the steering mechanism itself, resulting in increased likelihood of malfunction, or even worse, failure leading to costly downtime.

Additionally, the mechanism of U.S. Pat. No. 5,272,859 is subject to side forces from the torque applied to the gearbox by the drive mechanism and the cutterbar forces within the crop harvesting header on which the rotatable gearbox is mounted. These external forces place a side load on the steering mechanism linkage and can result in a binding of the telescoping tubes forming the linkage, which results in a thrust load on the gearbox and the connecting apparatus, particularly when the header rises and the telescopic tubes slide together. These telescoping tubes also present a hinge-like degree of freedom which can contribute further to vibrations in the instrument.

SUMMARY OF THE INVENTION

Accordingly, an important object of the present invention is to provide a crop harvesting implement that overcomes the above mentioned problems encountered in the prior art.

It is another object of the present invention to provide a steering mechanism cooperable with the mechanical drive line.

It is a feature of the present invention that the drive line supported by the tongue to deliver rotational power to the gearbox is retained in substantial alignment with the tongue.

It is yet another object of the present invention to provide a steering mechanism that generally maintains alignment of the gearbox input shaft with the tongue as its tongue pivots about the tongue pivot axis during field operation.

It is another feature of the present invention that the steering mechanism minimizes the operating angles of the universal joints in the mechanical drive line.

It is an advantage of the present invention that the steering mechanism can be easily removed and stored for lateral transport of the implement.

It is another advantage of the present invention that the universal joints in the drive line supported by the tongue of a pull-type harvester are subjected to minimal deflection.

It is a further advantage of the present invention that the life of the drive line is increased.

It is another advantage of the present invention that the steering mechanism is connected at the rear of the tongue by plates so that if the pivots wear, only the plates need to be replaced.

It is another feature of the present invention to provide a steering mechanism that is durable in construction, inexpensive of manufacture, ease of maintenance and facile in assemblage.

These and other objects, features, and advantages are accomplished according to the present invention by providing a crop harvesting implement having a wheeled frame, a draft tongue pivotable between extreme left and right operating positions, a mechanism for pivoting the tongue, a drive line for transmitting rotational power from a tractor when coupled thereto, a crop harvesting header suspended from the frame and having operable components for engaging and processing crop material, a gearbox for receiving rotational power from the drive line and transmitting the power to the operable components of the crop harvesting header, an input shaft operatively connected to the drive line, a means for mounting the gearbox on the header so that the header rotates, and a steering mechanism for effecting rotational movement of the gearbox in concert with the pivotal movement of the tongue. The steering mechanism is located on the drive line to pivot the gearbox about its generally vertical pivot axis in response to the pivotal movement of the tongue during field operations so as to keep the input shaft of the gearbox at least generally aligned with the tongue.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENTS

Figure 1:
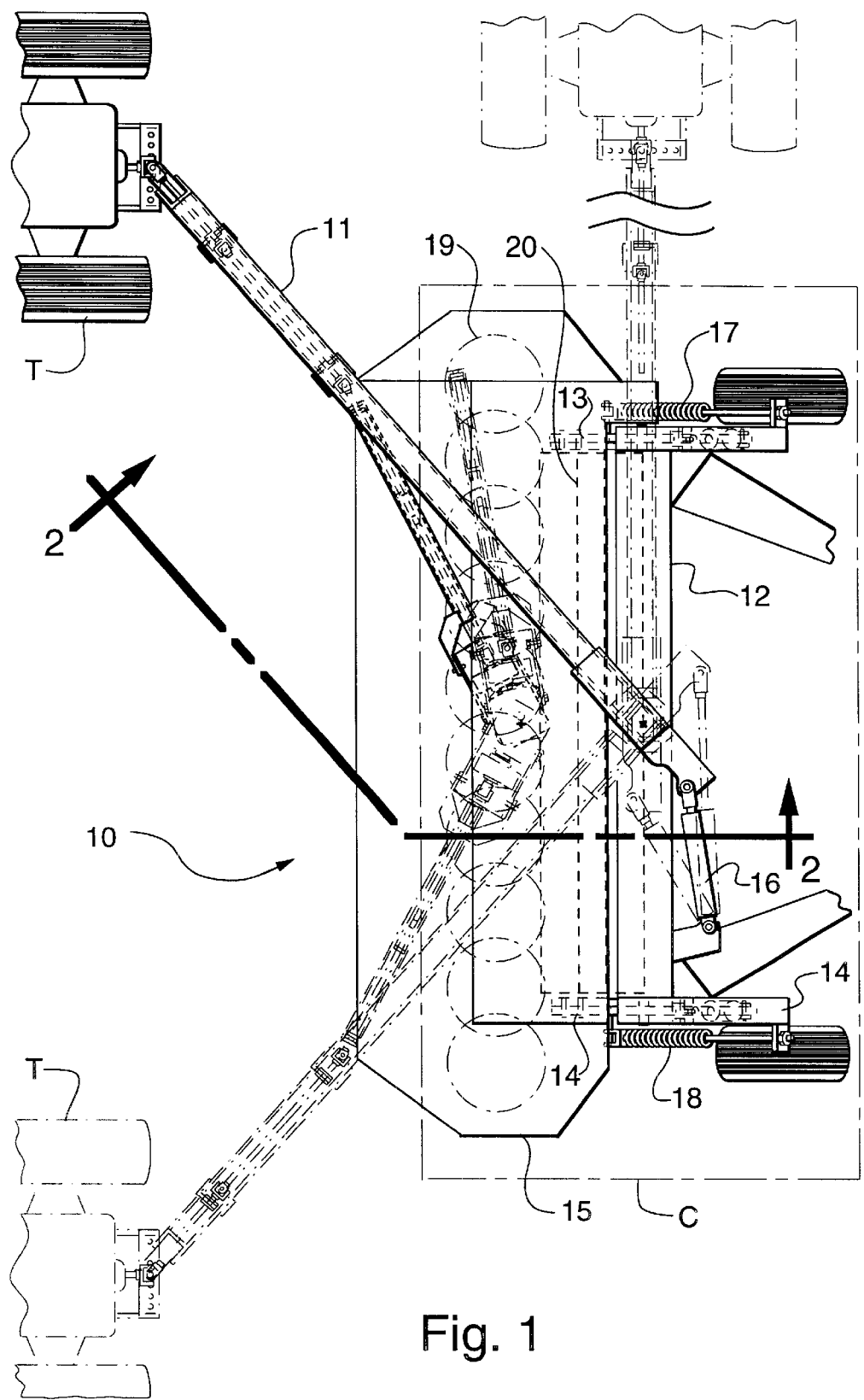
FIG. 1 is a top plan view of a hay harvesting implement incorporating the principles of the present invention, the implement being connected to a tractor to provide power thereto, the tongue and gearbox steering arm in the left side operating position being shown in solid lines with the right side operating position being shown in phantom lines, the transport position with the drive line disconnected also being shown in phantom lines, the trailer being indicated by a dashed line rectangle, portions of the tractor and the implement being broken away for purposes of clarity.
Figure 2:
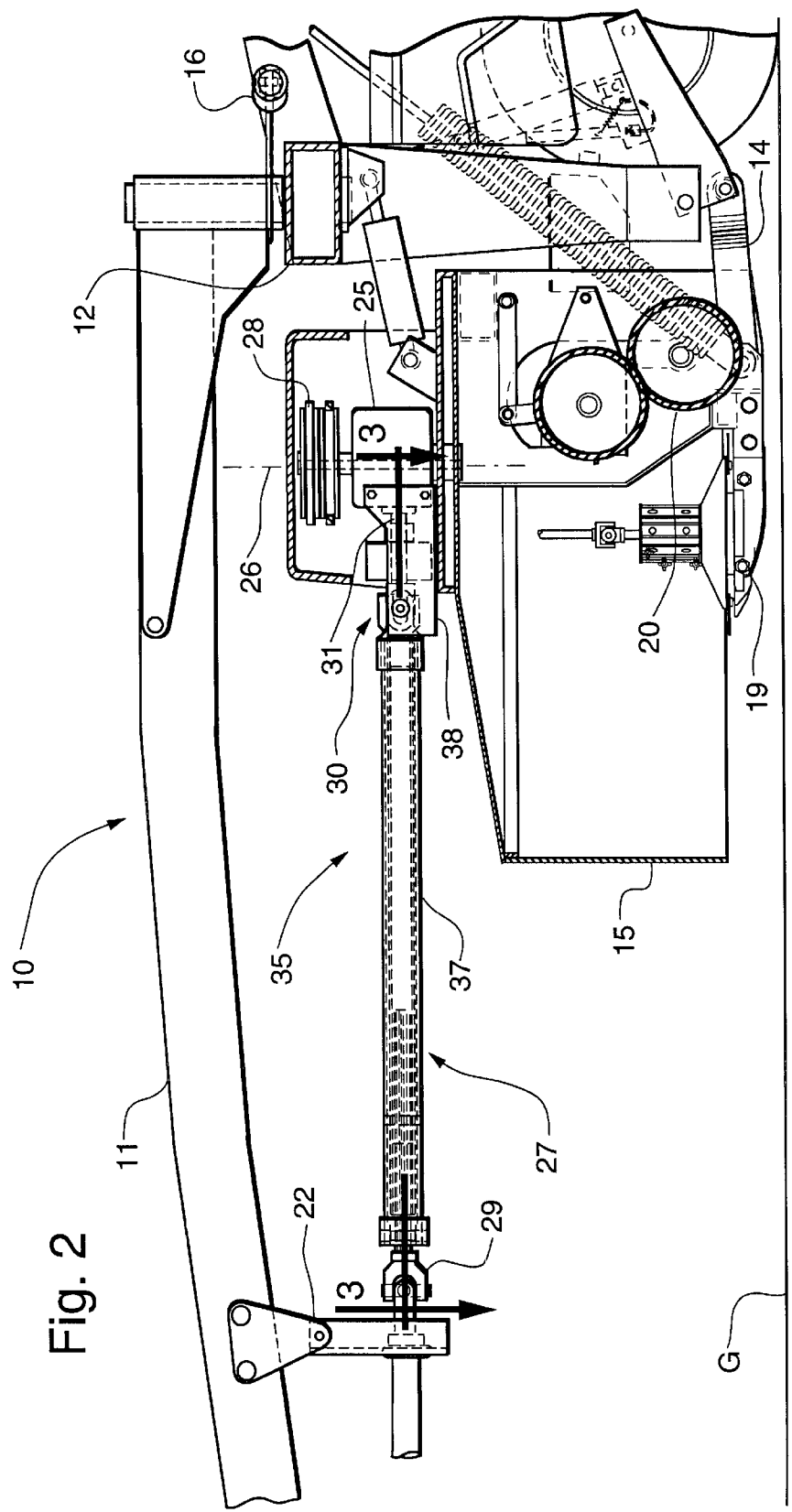
FIG. 2 is a cross-sectional view corresponding to lines 2—2 of FIG. 1 to depict the gearbox steering mechanism in side elevation.

Referring to FIGS. 1–2, a mower-conditioner incorporating the principles of the instant invention can be seen. Any left and right references are used as a matter of convenience and are determined by standing at the rear of the machine facing the hitch portion of the tongue into the normal operative direction of travel.

The mower-conditioner 10, exemplary of pull-type hay harvesting implements, includes a centrally pivoting tongue 11 extending forwardly of the wheeled frame 12 adapted for movement over the field to harvest hay crop. The mower-conditioner 10 is shown swung to the extreme left operative position in solid lines and is shown in the extreme right operative position in phantom outline. A hydraulic swing cylinder 16 interconnecting the frame 12 and the rearward portion of the tongue 11 pivots the tongue to these operative positions in a conventional manner. A tractor T is attached to the mower-conditioner 10 that provides both motive power and operational power to operate the crop harvesting header 15.

The crop harvesting header 15 is mounted on the forward portion of the frame 12 to engage standing crop material, sever the crop material from the ground G, and further harvest the severed crop material by conditioning the hay crop before discharging the conditioned crop to the ground behind the wheeled frame 12. In particular, the header 15 is suspended from frame 12 by links 13, 14 and springs 17 and 18 for general vertical movement relative to frame 12 by means of conventional lift cylinders. The header 15 includes conventional harvesting components, including a cutterbar 19, preferably in disc configuration, for severing the crop material, and a conditioning mechanism 20, preferably of the known counter-rotating roll configuration, the latter receiving the severed crop from the cutterbar 19 and then conditioning it by crushing or crimping the stems thereof. U.S. Pat. No. 6,044,633, issued to Thomas L. Stiefvater, et al on Apr. 4, 2000, illustrates a prior art harvester of the general type shown in FIG. 1 and is hereby incorporated by reference.

The header 15 further includes a centrally mounted rotatable gearbox 25 operable to receive rotational power from a conventional power-take-off (PTO) drive line 27, which extends along and is rotatably supported by the tongue 11 by suitable hangers, such as the hanging support 22. Power is provided for driving the harvester components via a belt drive assembly 28 coupled to the output shaft of the gearbox 25 in a well known manner. It is desirable to pivot the gearbox 25 about its generally vertical pivot axis 26 in response to the pivoting of the tongue 11 so as to keep the input shaft 31 of the gearbox 25 at least generally aligned with the tongue 11 during swing operation between the extreme left and right tongue positions and thereby keep universal joints 29 and 30 within acceptable bend angles. To this end, the present invention contemplates a unique steering mechanism 35 on the drive line 27 such that the gearbox is rotated in response to the transverse movement of the tongue 11.

Figure 3:
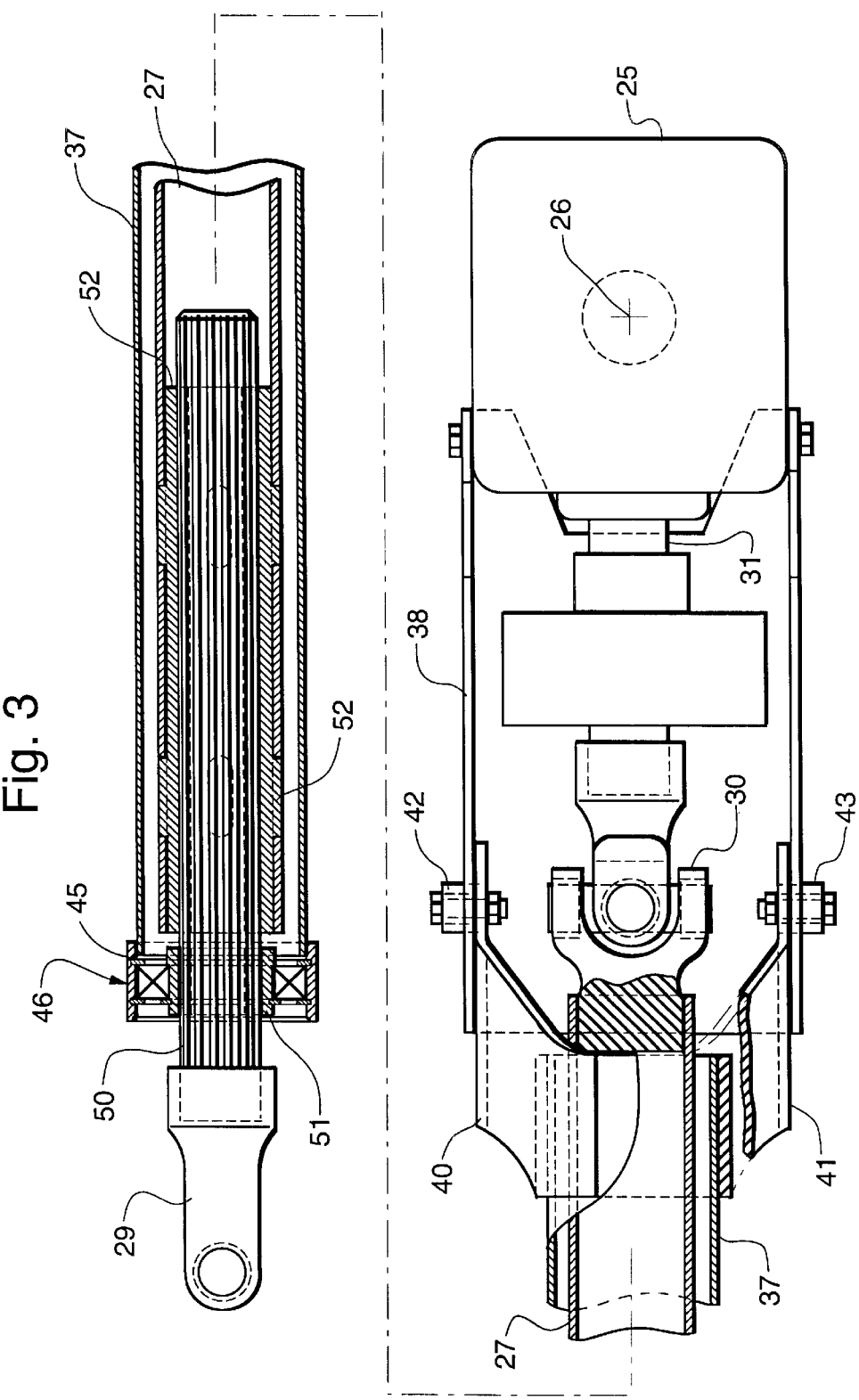
FIG. 3 is an enlarged cross-sectional view of the steering mechanism corresponding to lines 3—3 of FIG. 2, with the central portion broken away for purposes of clarity.

The steering mechanism 35 is best shown in detail in FIG. 3. At the rearward end of drive line 27, a steering tube 37 is pivotally connected to channel 38 projecting forwardly from the gearbox 25. The channel 38 provides a rigid housing and protectively encircles universal joint 30 and the gearbox input shaft 31. Two arms 40 and 41 provide the connection between the steering tube 37 and the channel 38 and contain pivots 42 and 43, which provide for pivotal movement of the steering tube 37 about an axis passing through the center of the universal joint 30 so that the steering tube 37 will move with the drive line 27.

The hollow steering tube 37 extends forwardly from the channel 38 concentrically with the drive line 27 to near the front end of drive line 27 at the universal joint 29. A housing 45 is welded to the forward end of steering tube 37. The housing 45 retains ball bearing 46 at its outside diameter for rotatably supporting the steering tube 37 on the drive line 27. A splined sleeve 51 is located inside bearing 46 and is slidably connected to a splined shaft 50, which in turn is coupled to and extends rearwardly from the universal joint 29. A splined sleeve 52 is connected to the forwardmost end of drive line 27 and is slidably supported on the splined shaft 50.

When the tongue 11 is pivoted back and forth to reposition the harvesting portion of the mower conditioner 10 laterally of the tractor T, the splined shaft 50 telescopically extends and retracts forwardly of the steering tube 37 to permit the tongue 11 to turn about its respective pivot axis. Since the drive line 27 is supported from the tongue 11 by the hanger 22, the splined shaft 50 follows the lateral movement of the tongue 11 and has the effect of steering the gearbox 25 as the tongue 11 is moved from side to side during operation.

Furthermore, as the header raises and lowers, the splined shaft 50 telescopes in the splined sleeve 51 and the splined sleeve 52 to accommodate the change in distance between the gearbox 25 and the tongue 11 in the manner described above. The universal joints 29, 30 provide for vertical bending of the drive line 27 to allow the header 15 to raise and lower relative to the tongue 11 and the frame 12. The connection between the steering tube 27 and the channel 38 prevents the universal joint 30 from bending horizontally; therefore, any horizontal bending of the drive line 27 must be accomplished at the universal joint 29. The steering tube 27 keeps the input shaft 31 pointed at the universal joint 29.

Of the many implicit and explicit advantages of the present invention, one of the most important is the ease of converting the implement 10 into lateral transport of the implement 10 as will be described below. On the wider pull-type implements, it is necessary to transport them laterally on the highway on a trailer C. As a result, the tongue 11 must be pivoted approximately 90 degrees from the front central position to minimize the width of the transportation of the implement. In the present invention, in order to prepare for lateral transport, only the steering mechanism 35 has to be disconnected. This is an improvement over the prior art devices, such as is shown in U.S. Pat. No. 6,044, 633, in which the drive line would have to be removed from its driving jackshaft and the steering mechanism disconnected from the tongue 11 before the tongue 11 can be swung to the far lateral transport position as shown in phantom in FIG. 1.

In the present invention, the tongue 11 will become the hitch connection for the trailer, shown in dashed lines in FIG. 1. In the preferred embodiment, the driveline 27 and the steering tube 37 mounted thereon are easily disconnected at the front end by a quick disconnect coupler (not shown) attached to said hanging support 22. The forward end of the driveline 27 and steering tube 37 can be supported on the header during transport. The tongue 11 can then be rotated approximately 90 degrees to extend laterally of header 15. Fastening the implement to the trailer C will thus allow the implement 10 to be towed endwise over the public highways.

Additional advantages of the steering mechanism 35 of the present invention includes durability of construction, inexpensive to manufacture, easy to maintain, and easy to assemble. Furthermore, the steering mechanism of the present invention is simple and inexpensive to manufacture due to the fact that it contains few parts.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In a crop harvester having
a wheeled frame,
a tongue having a forward end extending forwardly from said frame for connection with a prime mover and a rearward end pivotally mounted on said frame for movement about a first pivot axis to vary the lateral position of the machine relative to said prime mover and,
a control mechanism for pivoting said tongue relative to said frame;
a drive line for transmitting rotational power from said prime mover when coupled thereto;
a crop harvesting header suspended from said frame and being forwardly disposed relative thereto, said crop harvesting header having operable components for engaging and processing crop material as said crop harvesting header is moved forwardly;
a gearbox mounted on said header for receiving rotational power from said drive line and transmitting said power to said operable components of said crop harvesting header, said gearbox having an input shaft operatively connected to said drive line;
said gearbox being pivotally mounted on said header such that said gearbox rotates about a second pivot axis spaced longitudinally from said first pivot axis; and
a steering mechanism for effecting rotational movement of said gearbox in concert with the pivotal movement of said tongue, the improvement comprising:
said steering mechanism being located on said drive line to pivot said gearbox about its generally vertical pivot axis in response to the pivotal movement of the tongue during field operation so as to keep said input shaft at least generally aligned with said tongue.

2. The crop harvester as set forth in claim 1 wherein said steering mechanism includes a rear portion pivotally connected with said gearbox and a front portion having a bearing for rotatably supporting said drive line within said steering mechanism.

3. The crop harvester as set forth in claim 2 wherein said steering mechanism includes a hollow tube through which said drive line passes for connection with said gearbox.

4. The crop harvester as set forth in claim 3 wherein said drive line includes a telescopic section including a splined portion on which said bearing is mounted, said splined portion of said drive line being mounted in said bearing for sliding movement relative thereto.

5. The crop harvester as set forth in claim 4 wherein said rear portion of said steering mechanism includes a mounting bracket affixed to said gear box to be movable therewith, said hollow tube being pivotally connected at a horizontal pivot to said mounting bracket to permit generally vertical pivotal movement relative to said mounting bracket, said pivot being aligned with a universal joint in said drive line.

6. The crop harvester as set forth in claim 1 wherein said steering mechanism comprises:
   a channel projecting from and connected to said gearbox;
   a steering tube pivotally connected to said channel by two arms;
   a housing welded to the forward end of said steering tube, said housing supporting a bearing to support said steering tube on said drive line, said drive line including a telescopic portion extending forwardly from said steering tube.

7. The crop harvester as set forth in claim 6 wherein said telescopic portion includes a splined sleeve slidably connected to a splined shaft which telescopes forwardly of said steering tube.

8. The crop harvester as set forth in claim 7 wherein said steering tube causes said gearbox to pivot about its generally vertical pivot axis in response to the pivotal movement of the tongue and the resulting forces imposed by the splined shaft onto the steering tube.

9. The crop harvester as set forth in claim 7 wherein said tongue is pivotable to a position extending laterally from said frame to provide a towing member for said crop harvester when mounted on a trailer for transport over the highway, said drive line being disconnectable from said tongue to permit said steering mechanism to be placed into an inoperative configuration.

10. The crop harvester as set forth in claim 1 wherein said steering mechanism is supported on said header when disconnected from said tongue for lateral transport.

* * * * *